United States Patent
Wu et al.

(10) Patent No.: US 8,077,755 B2
(45) Date of Patent: Dec. 13, 2011

(54) MULTI-MODE COEXISTENCE METHOD FOR A MULTI-MODE COMMUNICATION DEVICE

(75) Inventors: Gongwei Wu, Beijing (CN); Wenying Shan, Beijing (CN); Yufei Zhang, Beijing (CN); Zheng Wang, Beijing (CN); Chunmei Pei, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 442 days.

(21) Appl. No.: 11/887,597

(22) PCT Filed: Dec. 7, 2005

(86) PCT No.: PCT/CN2005/002110
§ 371 (c)(1),
(2), (4) Date: Jul. 22, 2009

(87) PCT Pub. No.: WO2006/102814
PCT Pub. Date: Oct. 5, 2006

(65) Prior Publication Data
US 2009/0296785 A1    Dec. 3, 2009

(30) Foreign Application Priority Data
Mar. 31, 2005    (CN) .......................... 2005 1 0062584

(51) Int. Cl.
*H04B 1/00* (2006.01)

(52) U.S. Cl. ......... 375/132; 375/130; 375/343; 375/346

(58) Field of Classification Search .................. 375/132, 375/130, 343, 346; 370/338, 344, 345; 455/41.2, 455/63.1, 63.3
See application file for complete search history.

(56) References Cited

U.S. PATENT DOCUMENTS

| | | | |
|---|---|---|---|
| 6,192,224 B1 | 2/2001 | Grayson et al. | |
| 7,356,104 B2 * | 4/2008 | Fukuda et al. | 375/346 |
| 2003/0060206 A1 | 3/2003 | Sointula et al. | |
| 2004/0162106 A1 * | 8/2004 | Monroe et al. | 455/552.1 |
| 2004/0203398 A1 | 10/2004 | Durrant | |
| 2005/0170776 A1 | 8/2005 | Siorpaes | |
| 2005/0215284 A1 * | 9/2005 | Su et al. | 455/556.2 |

FOREIGN PATENT DOCUMENTS

| | | |
|---|---|---|
| CN | 1610422 A | 4/2005 |
| JP | 2192330 A | 7/1990 |
| JP | 2001053666 A | 2/2001 |
| JP | 2001238251 A | 8/2001 |
| JP | 2002232384 A | 8/2003 |
| JP | 2003234745 A | 8/2003 |
| JP | 2004274741 A | 9/2004 |
| KR | 2004 000 198 A | 1/2004 |

* cited by examiner

*Primary Examiner* — Dhaval Patel
(74) *Attorney, Agent, or Firm* — Kinney & Lange, P.A.

(57) ABSTRACT

The present invention discloses a multi-mode coexistence method of a multi-mode communication device comprising steps of: setting priorities of frequency usage for all modes supported by the multi-mode communication device; determining a channel where a signal of a lower priority mode are interfered with by that of a higher priority mode; performing frequency hopping to outside said determined channel by the lower priority mode. The invention allows signals of various modes to coexist in the multi-mode communication device without modifying the existing RF reception system, and thus reduces the system cost and implementation complexity.

12 Claims, 3 Drawing Sheets

MULTI-MODE COEXISTENCE METHOD FOR A MULTI-MODE COMMUNICATION DEVICE

BACKGROUND

1. Field of Invention

The present invention relates to a multi-mode communication device in the field of wireless communication technology, in particularly to a multi-mode coexistence method of the multi-mode communication device.

2. Description of Prior Art

In the field of wireless communication, signals are modulated in various modulation modes and transmitted via different or same frequency domains in order to realize voice and digital communication. So far, a variety of networks have been constructed, such as GSM/GPRS (Global System for Mobile Communication/General Packet Radio Service) networks and CDMA (Code Division Multiple Access) networks, each of which is highly popularized and takes a large coverage, WLAN(Wireless Local Area Network) which provides a much higher transmission data rate, shorter transmission distance and much lower cost, Bluetooth with the shortest transmission distance to replace a cable function, and so on. During a considerably long term, these communication modes will coexist and provide their own advantages since they have been bringing different convenience and benefit to users in terms of voice, wireless office, VoIP (Voice on IP) and the like. Accordingly, the evolution of the communication device is also oriented towards a so called multi-mode communication device which supports multiple modes simultaneously.

Mutual interference between different modes of signals is always incurred while these signals are traveling on the air simultaneously. Such interference becomes rather severe especially with respect to modes utilizing the same frequency domain. Even in modes using different frequency domains, the out-of-band spurs of signals in one mode probably impose some interference on signals in another mode. In practical applications, the interference between multi-mode signals leads to degradation of voice communication quality, reduction of data transmission rate and even congestion to normal communication, and thus has a strong impact on the reliability and practicability of a communication system. Therefore, multi-mode communication devices are confronted with the problem of multi-mode coexistence.

Currently, most of multi-mode coexistence methods in various communication modes are to evade any interfered channel by means of frequency hopping, such as adaptive frequency hopping, channel retrieval and the like. In such frequency hopping method, the communication device is required to first receive signals on an interfered channel, then analyze and decide the quality and properties of the signals and finally determine whether to effect frequency hopping on this channel. In this way, the requirement on the corresponding reception system is very strict. Even thought a high-performance reception system is adopted, the communication device may hardly carry out a normal operation when exposed to strong interference.

US patent application publication no. US 20040137849 discloses a method for evading an interfered channel by use of frequency hopping, in which, with its reception system being renovated, a communication device first analyzes the frequency interference range of the received signal, obtains a hop sequence for evading the interference signal and then performs frequency hopping. This method necessities a complex renovation of the reception system in the existing communication device, leading to difficult implementation and costly application.

SUMMARY

The object of the present invention is to provide a multi-mode coexistence method for solving the problem that a multi-mode communication device has to perform frequency hopping based on a received signal as well as the complex implementation and high cost of the reception system of the multi-mode communication device.

According to the present invention, the multi-mode coexistence method of a multi-mode communication device comprises steps of:

a) setting priorities of frequency usage for all modes supported by the multi-mode communication device;

b) determining a channel where a signal of a lower priority mode are interfered with by that of a higher priority mode;

c) frequency hopping the lower priority mode out of the determined channel.

Preferably, between the steps a) and b), the method also comprises a step ab1) of storing in the multi-mode communication device the correspondence between the channel of said mode and frequency interference range generated by the channel.

Preferably, between the steps ab1) and b), the method also comprises steps of:

ab2) starting frequency hopping by the multi-mode communication device;

ab3) deciding whether the mode starting frequency hopping is the highest priority mode currently used, and if so, performing frequency hopping, and otherwise, proceeding to a step ab4);

ab4) setting each of currently-used modes with a priority higher than that of said mode starting frequency hopping as the higher priority mode, and said mode starting frequency hopping as the lower priority mode, and then proceeding to step b).

Preferably, after the step c), the method further comprises steps of:

d) deciding whether the mode starting frequency hopping is the lowest priority mode currently used, and if not so, executing step e);

e) deciding whether the frequency-hopped signal of said mode starting frequency hopping is interfering with any of currently-used modes with a priority lower than said mode starting frequency hopping, and, if there is interference, starting frequency hopping by those interfered modes in a descending order of priority.

Preferably, said step ab2) of starting frequency hopping includes starting communication connection and starting channel change.

Preferably, the step b) further comprises:

b1) determined the channel used by the signal of the higher priority mode;

b2) determining the frequency interference range of said signal of the higher priority mode based on the correspondence between the channel for said higher priority mode and the frequency interference range generated by the channel;

b3) determining the channel for the lower priority mode which is located within the frequency interference range of said signal of the higher priority mode.

Preferably, said generated frequency interference range includes channel bandwidth of said channel.

Preferably, all modes supported by said multi-mode communication device comprise modes with different operating frequency domains.

Preferably, said generated frequency interference range further includes frequency range beyond a predetermined threshold in the out-of-band spurs generated by said channel.

Preferably, the following steps are also included between the steps a) and ab1):

measuring the frequency range beyond a predetermined threshold in the out-of-band spurs generated by said channel;

determining the correspondence between said channel and said frequency range beyond a predetermined threshold based on the measurement result.

Preferably, between the steps b) and c) is included a step of determining the channel where the signal of the lower priority mode will interfere with that of the higher priority mode.

Preferably, said channel where the signal of the lower priority mode will interfere with that of the higher priority mode is a channel for the lower priority mode which includes the channel used by the higher priority mode and is located within the frequency range beyond a predetermined threshold in the generated out-of-band spurs.

Preferably, all modes supported by said multi-mode communication device have the same frequency domain.

Preferably, said multi-mode communication device supports both modes of WLAN and BlueTooth, and the mode priority of WLAN is set as higher than that of BlueTooth.

Preferably, between the steps b3) and c) is included a step of setting the channel quality level for adaptive frequency hopping in the BlueTooth mode.

By determining the frequency interference range caused by the signal of a higher priority mode in the multi-mode communication device before the frequency hopping for a mode, the present invention actively evades the interfered channel, enables signals of difference modes to coexist in the multi-mode communication device and reduces the cost and implementation complexity of the reception system.

DETAILED DESCRIPTION

Figure 1:
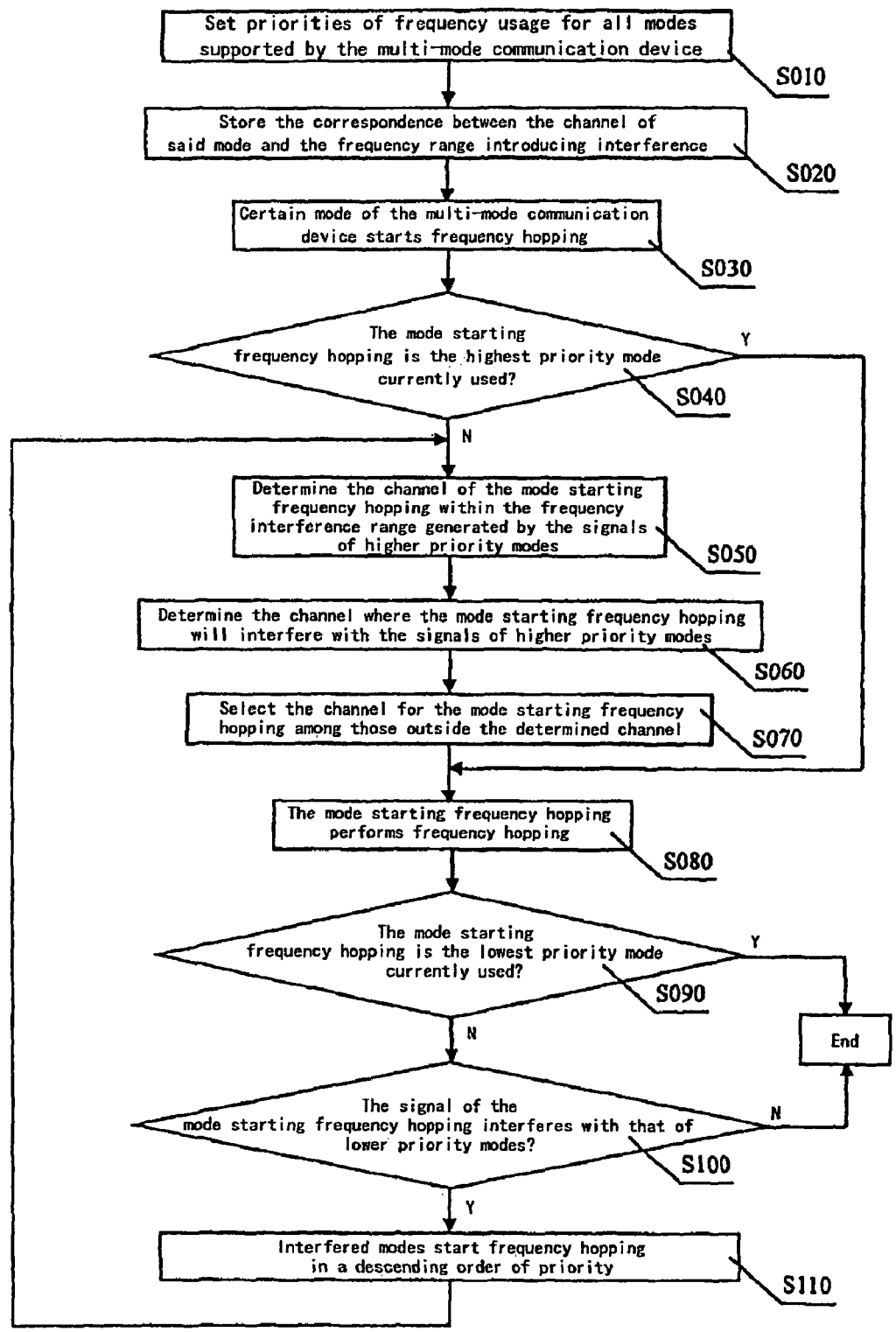
FIG. 1 shows a flowchart of the method according to the present invention.

When a user uses some single-mode communication device, interference between such devices is relatively small since the devices are spaced at a long distance and thus the transmitted signals will suffer from certain path loss. When a user uses a multi-mode communication device, however, there exist higher risks in incurring the problem of interference between signals of different modes. The situation, which is more complex and gives rise to the most severe interference, is that a user utilizes different communication modes, such as GSM/GPRS, WLAN, BlueTooth and the like, simultaneously in a single multi-mode communication device. To be more specific, since respective modules within the multi-mode communication system are very close to each other, in most cases, what causes the most strong interference to signals of one mode in the multi-mode communication device is exactly the signals of the other modes in the same communication device. This makes a great contribution to the current difficulty concerning multi-mode coexistence.

For two modes having the same operating frequency domain in the multi-mode communication system, when one of the two modes is operating in some channel, the frequency range within which the other mode having the same frequency domain will be interfered with is generally the in-channel bandwidth of this channel. The frequency range within which another mode may be interfered with due to the usage of some channel can be determined according to the protocol specification of the mode using the channel.

For two modes having different operating frequency domains in the multi-mode communication system, it should be taken into account that the out-of-band spurs generated by one of the two modes may interfere with the other mode. In this case, there is no need to consider the communication mode with a lower transmitting power during operation since its out-of-band spurs will be attenuated and thus cause substantially no interference to the other mode. For the mode with a higher transmitting power, a predetermined threshold can be provided, and the out-of-band spurs below the predetermined threshold cause substantially no interference to the other mode.

In practical applications, products of various models in the same communication mode generate different out-of-band spurs. In other words, the distribution of out-of-band spurs is dependent on the design of the product model specifically selected and used. In designing a multi-mode communication device, the out-of-band spurs generated by a mode actually used needs to be measured, and the correspondence between the channel of the mode and the out-of-band spurs beyond a predetermined threshold should be stored in the multi-mode communication device. As such, for communication in this mode, the frequency range within which the out-of-band spurs will interfere with other modes can be derived from the channel used by the mode.

Accordingly, before the frequency hopping for one mode in a multi-mode communication device, a, channel, which doesn't suffer from interference by other modes and/or impose interference to other modes, can be selected, and then perform frequency hopping in a pertinent manner so as to realize multi-mode coexistence.

FIG. 1 shows a flowchart of the method according to the present invention. The frequency-hopping priorities of all communication modes supported by a multi-mode communication device are set in step S010. A higher priority mode is given the precedence to occupy a frequency band, and a lower priority mode, upon its frequency hopping, will initiatively avoid the frequency interference ranges of the signals of higher priority modes.

The mode with a larger overhead can be set to have a higher priority. Generally speaking, for modes with the same operating frequency domain, a higher priority can be given to the mode which is fixed in networking and has fewer channels but more difficulty in effecting frequency hopping. On the contrary, a lower priority can be given to the mode which is flexible in frequency hopping and networking and has more channels. For modes with different operating frequency domains, the mode having difficulty in performing frequency hopping can be set at a higher priority. To sum up, the priority setting should be carried out with comprehensively consideration of certain factors, such as the modes supported by the multi-mode communication device, the operating frequency domains, the number of channels and the frequency hopping intervals of these modes, the overhead of the multi-mode communication device due to frequency hopping for different modes and the like.

In step S020, the correspondence between channels of the respective modes and the associated frequency ranges in which interference is caused is stored in the multi-mode communication device. As described above, the storing in this step includes storing the correspondence between the channels and their respective bandwidths as well as the correspondence between the channels for the modes of strong transmitting power and the frequency ranges of their out-of-band spurs beyond predetermined thresholds.

In step S030, a mode of the multi-mode communication device starts frequency hopping. The starting of frequency hopping in this step comprises starting communication connection and changing communication channels by the mode as well as other events due to which the operating frequency of the multi-mode communication device is to be changed.

In step S040, it is decided as to whether the mode starting frequency hopping has the highest priority among the currently used modes. If so, the flow jumps to step S080; otherwise, step S050 will be executed.

In step S050, the channel of the mode starting frequency hopping, which is within the frequency interference range of signals of higher priority modes, is determined. The higher priority modes means all the modes currently used and having higher priorities than that of the mode starting frequency hopping.

In this step, the channels used by the higher priority modes are first determined. Then, the frequency interference range for the signals of each of the higher priority modes is determined based on the correspondence between channel and its generated frequency interference range stored in the multi-mode communication device in step S020. So far, the channel of the lower priority mode interfered with by the signals of the higher priority mode can be obtained.

In step S060, the channel is determined in which the mode starting frequency hopping will interfere with the signals of the higher priority modes. For the modes having the same operating frequency domain, the possibility of interference the mode starting frequency hopping causes to the higher priority modes has been excluded in step S050. Therefore, step S060 needs to be executed only when the mode starting frequency hopping has a different operating frequency domain from those of the higher priority modes, and the frequency range beyond a predetermined threshold is present in the generated out-of-band spurs.

If the frequency range beyond a predetermined threshold in the out-of-band spurs generated by certain channel of the mode starting frequency hopping covers a channel being used by any of the higher priority modes, this channel of the mode starting frequency hopping is classified as a channel to interfere with the signals of the higher priority modes.

In step S070, a channel is selected for the mode starting frequency hopping from available channels except the above-determined channel.

In step S080, the mode starting frequency hopping performs frequency hopping.

In step S090, it is decided as to whether the mode starting frequency hopping is the lowest priority mode currently used. If so, the flow is ended; otherwise, step S100 will be executed.

In step S100, it is decided as to whether the signal after the mode starting frequency hopping has performed frequency hopping interferes with any lower priority mode, and step S110 will be executed if the answer is yes, otherwise, the flow is ended. The lower priority modes means all currently used modes whose priorities are lower than that of the mode starting frequency hopping.

The frequency interference range of the signal after the mode starting frequency hopping has performed frequency hopping can be determined in the same manner as that in step S050. Once this frequency interference range of the mode starting frequency hopping is determined, it can be learnt as to whether the lower priority modes will be interfered with.

In step S110, the interfered modes are caused to start frequency hopping in a descending order of priority.

As described above, the present invention shares the information on frequency usage and interference occurrence between the respective modes in the multi-mode communication device, determines the channel having no interference from any higher priority mode as the target channel, creates a hop sequence within the range of the target channel, establishes a transceiving link and conducts a normal communication. In this way, the interference between the respective modes in the multi-mode communication device can be avoided, and thus the problem of multi-mode coexistence in the multi-mode communication device can be effectively solved.

In the first embodiment of the present invention, the multi-mode communication device supports two communication modes of WLAN and BlueTooth. There is usually a CPU (Central Processing Unit) and a storage unit in a multi-mode communication device. In this embodiment, CPU communicates with WLAN via SPI (Series Peripheral Interface), acquires the information about channel usage of WLAN and sends instructions to a WLAN unit. On the other hand, CPU communicates with BlueTooth via UART (which is an asynchronous series interface).

Figure 2:
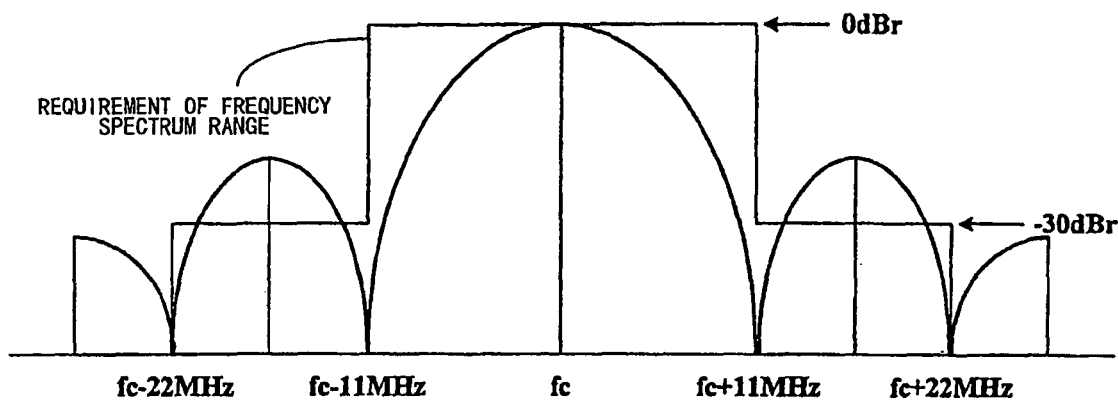
FIG. 2 shows a schematic diagram for the spectrum range requirement of WLAN channel in the protocol 802.11b.

The operating frequency domain for WLAN is 2.4-2.4835 GHz as specified by FCC (Federal Committee of Communication), IC (Industry of Canada) and ETSI (Europe). Such frequency range is superposed on the frequency domain 2.4-2.483 GHz for BlueTooth. FIG. 2 shows spectral mask (the spectrum range requirement) of WLAN channel in the protocol 802.11b. The peak of a WLAN channel is general 10 dBm to 20 dBm (absolute level) and far larger than that of BlueTooth, i.e., 0 dBm. Outside the range of −11 MHz to +11 MHz around the central frequency fc, that is, outside of the bandwidth of the channel, the power at each frequency should be at least −20 dBm to −10 dBM smaller than the peak. Meanwhile, the interference can be construed as relatively small compared with 0 dBm for BlueTooth. As specified in the relevant protocol, the central frequency fc can be derived from the following equation when WLAN is operating at the $M^{th}$ channel:

$$fc=2412+(M-1)\times 5$$

When WLAN operates at the $M^{th}$ channel, the lowest interference frequency fmin, which generates certain frequency interference range, is expressed as $$f\text{min}=2412+(M-1)\times 5-11,$$

and the highest interference frequency fmax is expressed as $$f\text{max}=2412+(M-1)\times 5+11.$$

WLAN is given a higher priority than BlueTooth in this embodiment. Since WLAN operates in the same frequency domain as that for BlueTooth, the influence of out-of-band spurs can be neglected. Moreover, since the BlueTooth has the lowest priority, and thus it is unnecessary to calculate the frequency interference range generated by BlueTooth when no consideration is given to the influence of out-of-band spurs, only the correspondence between the channels used by WLAN and their channel bandwidth has to be stored in the multi-mode communication device.

After establishing WLAN connection, the multi-mode communication device reports to CPU the channel information of WLAN including the channel number M at which channel WLAN is operating. When connection for BlueTooth is to be established using certain channel, the CPU calculates the frequency interference range generated by WLAN, that is, fmin and fmax.

According to the protocol specification, BlueTooth has 79 channels over its operating frequency domain 2.4-2.483 GHz, and the array of channel numbers is designated as N(1:79) among which the channel Ni interfered by WLAN is expressed as $$Ni = N(fmin-2402:fmax-2402).$$

Having determined which channel will be interfered with, BlueTooth can directly select any channel other than the determined channel to establish communication connection and then perform normal communication using this selected channel.

The BlueTooth mode supports AFH (Adaptive Frequency Hopping). AFH can pass information on channel quality between two connected parties and form a hop sequence by analyzing the quality of the 79 channels and deciding which channel has a higher level of signal quality. AFH classifies channel quality into three levels of unknown, bad and good. During interaction between the two parties conducting Blue-Tooth communication, the party as the master device controls whether to enable AFH. If the master device sets AFH, the other party as the slave device will send the information on channel quality level to the master device, which will in turn set up the hop sequence used in frequency hopping by AFH.

For the BlueTooth communication adopting AFH, the free-of-interference channels also need to be calculated at the time of channel quality setup. The free-of-interference channels Nglit having lower frequencies than those of Ni are $$Nglit = N(1:fmin-2401),$$

while the free-of-interference channels Ngbig having higher frequencies that those of Ni are $$Ngbig = N(fmax-2401:79).$$

If the number of a WLAN channel is so small that fim (fmin-2401) is less than 0, Nglit will not exist, and only Ngbig will be provided during AFH channel setup. Similarly, when the number of a WLAN channel is great enough to make fmax more than 2483 MHz, Ngbig will not exist, and only Nglit will be provided during AFH channel setup.

In general, the quality level for the channel numbers in the arrays of Nglit and Ngbig is set as good, while the quality level for the channel numbers in the array of Ni is set as bad. In this way, the invention can be combined with AFH so that not only the multi-mode existence can be guaranteed inside the multi-mode communication device, but also the interference imposed on the terminal communication device can be maintained as small as possible.

When WLAN finds a new access point during current network interaction and thus needs to establish a new network connection, WLAN can directly change its channel since it is the highest priority mode in the multi-mode communication device. After having conducted frequency hopping successfully, WLAN reports to CPU the update information including the currently-used channel, signal strength and the like. Based on the update information, CPU calculates whether the channel used by BlueTooth suffers from interference. If there is interference, CPU calculates a channel suitable for the frequency hopping by BlueTooth and instructs via UART interface BlueTooth to perform frequency hopping.

Figure 3:
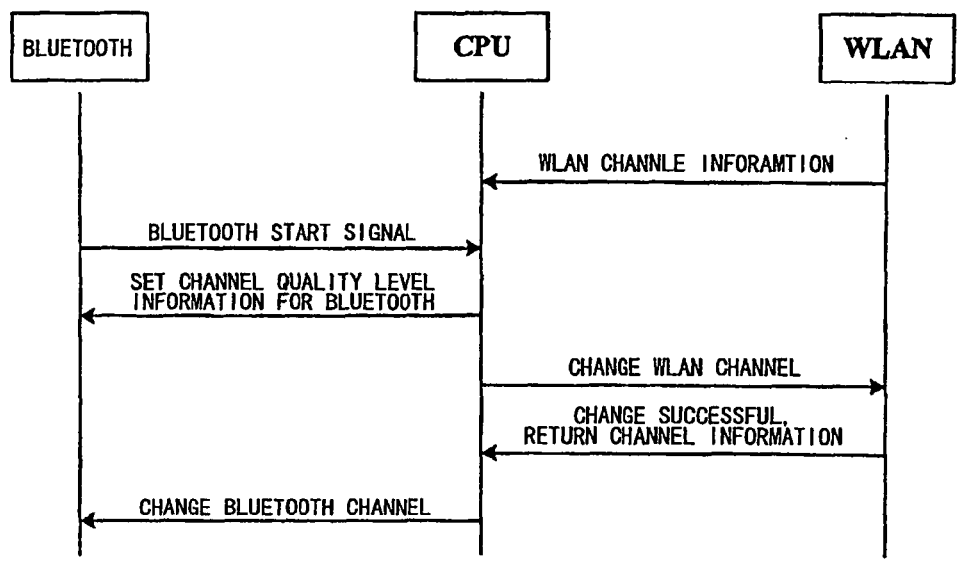
FIG. 3 shows a flowchart for the information interaction of frequency hopping process according to the first embodiment of the present invention.

The information interaction flow of the above frequency hopping process is demonstrated in FIG. 3, in which WLAN sends WLAN channel information to CPU after establishing connection; BlueTooth sends to CPU the start signal notifying that BlueTooth will establish connection immediately; CPU sets the channel quality level for BlueTooth, and Blue-Tooth establishes connection according to the channel quality level; CPU changes the channel for WLAN; WLAN returns to CPU channel information after a successful channel change; and CPU instructs BlueTooth to change its channel if the new channel for WLAN interferes with BlueTooth.

Some multi-mode communication devices are too simple to contain a CPU. In this case, the operation regarding the delivery of channel information and the calculation of frequency hopping destination channel can be fulfilled by using the existing MCUs (Micro-Control Units) and memories in respective units for realizing each communication modes and the existing connection interfaces between communication modes.

In the second embodiment of the present invention, the multi-mode communication device containing no CPU supports two modes of WLAN and BlueTooth. WLAN communicates with BlueTooth via a UART interface, and each of the units for realizing the two communication modes has its own MCU and memory. The priority is also given to WLAN over BlueTooth since the number of the channels used by the BlueTooth mode is larger, and frequency hopping is easier for BlueTooth than for WLAN. Therefore, the correspondence between WLAN channels and their bandwidth is stored in the unit for realizing the BlueTooth mode.

If WLAN has established communication connection first, that is, before BlueTooth does the same, BlueTooth will request WLAN for its channel information before actually establishing communication connection. WLAN sends to BlueTooth the used channel number and other relevant information in response to the request. On the other hand, if the first to establish communication connection is BlueTooth other than WLAN, WLAN sends to BlueTooth the used channel number and other relevant information via the UART interface after the completion of connection establishment.

Having received the channel number, BlueTooth calculates which channel, among its own channels, will be covered by the channel bandwidth of the this channel number, and selects a destination channel for frequency hopping from those outside the calculated channel. The calculation method is the same as that used in the first embodiment, and thus its detailed description is omitted here.

For the BlueTooth mode with AFH, the channel level for frequency hopping can be set as bad regarding the channel covered by the channel bandwidth used by WLAN so as to improve the hop sequence.

After changing the used channel due to frequency hopping or other requirements, WLAN sends the changed channel number and other relevant information to BlueTooth, which in turns repeats the above process to select a hop sequence.

Figure 4:
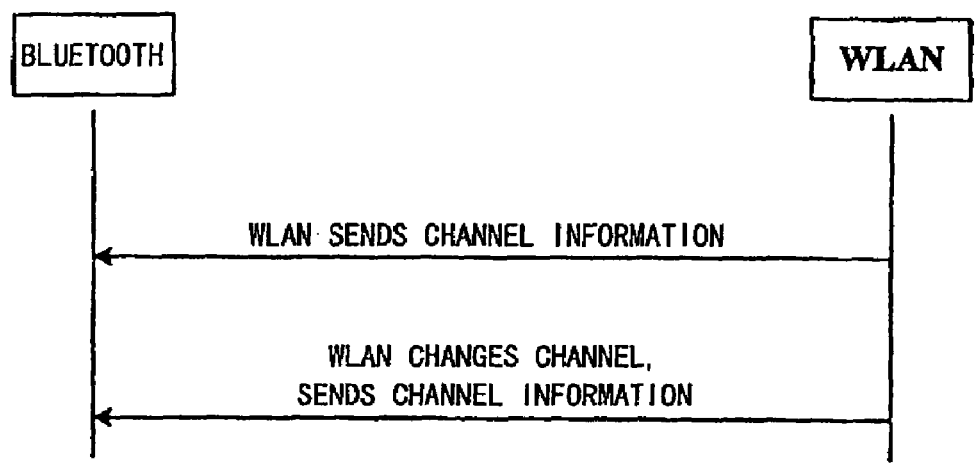
FIG. 4 shows a flowchart for the information interaction of frequency hopping process according to the second embodiment of the present invention.

FIG. 4 shows the information interaction flow of the present embodiment, in which WLAN sends the currently-used channel number and other channel information to Blue-Tooth in response to the request from BlueTooth, after establishing connection or after changing the used channel.

In the third embodiment of the present invention, the multi-mode communication device supports three communication modes of GSM/GPRS, WLAN and BlueTooth, which are all scheduled and managed by CPU.

In this embodiment, the priority allocation for the three modes depends on the convenience and the frequency domain characteristic in realizing frequency hopping. Although GSM/GPRS has the function of frequency hopping, the control over the channel for GSM/GPRS is not convenient when performed from inside the multi-mode communication device, since such channel is to be realized by the part of air link. Therefore, GSM/GPRS usually used a fixed channel and is allocated with the highest priority. In addition, the priority to WLAN is also higher than BlueTooth.

Since GSM/GPRS operates in a different frequency domain from that of WLAN and BlueTooth, the correspondence between channels for WLAN and BlueTooth and the bandwidth thereof should be stored in the multi-mode communication device, and further consideration should be given to the influence of the out-of-band spurs between WLAN/BlueTooth and GSM/GPRS. The out-of-band spurs of BlueTooth are neglected in the present embodiment since the transmitting power of BlueTooth is very low. As for GSM/GPRS and WLAN, interference still somewhat occurs though the signal strength itself is not great, as the GSM/GPRS protocol specifies that the signal strength of out-of-band spurs cannot exceed ~30 dBm, and WLAN 11b protocol specifies that the signal strength of out-of-band spurs cannot exceed ~45 dBm. Therefore, in the present embodiment, the frequency interference range is set as a frequency range in which the out-of-band spurs of WLAN and GSM/GPRS fall into the frequency ranges of each other, and the signal strength is greater than the reception sensitivity of the mode-realizing unit in the multi-mode communication device. Obviously, the predetermined threshold in the present embodiment is set according to the reception sensitivity for the interfered mode. Further, the correspondence between the channels for GSM/GPRS and WLAN and the frequency interference range generated by the out-of-band spurs thereof is stored in the multi-mode communication device.

As such, during normal operation, GSM/GPRS can learns the frequency interference range, for example, the range of 2.33-2.43 GHz covering the first to fifth channels for WLAN, generated by its out-of-band spurs based on the correspondence between the channels for GSM/GPRS and the frequency interference range. Similarly, the conclusion that the out-of-band spurs of the third to ninth channels for WLAN will interfere with the current operating channels for GSM/GPRS can be drawn from the correspondence between the channels for WLAN and their frequency interference range. As a result, WLAN can be arranged to operate at the eleventh channel outside the above channels for WLAN. Finally, the BlueTooth mode can be arranged to perform frequency hopping outside the range of 2.33-2.43 GHz and the frequency range of the eleventh channel for WLAN.

In summary, the present invention enables respective communication modes within the multi-mode communication device to pass channel information to each other and directly select free-of-interference channels based on the information about other channels and their interference. The inventive method is simple and easy to implement without any intricate computing device. With the present invention, the multi-mode communication device can complete automatic selection of channel by itself to enable the cooperation of multiple modes in the device, without adding any dedicated testing equipment or detection equipment to the reception system of the multi-mode communication device for detecting any air signal.

The foregoing description gives only the preferred embodiments of the present invention and is not intended to limit the present invention in any way. Thus, any modification, substitution, improvement or like made within the spirit and principle of the present invention should be encompassed by the scope of the present invention.

What is claimed is:

1. A multi-mode coexistence method for a multi-mode communication device comprising steps of:
    a) setting priorities of frequency usage for all modes supported by the multi-mode communication device;
    ab1) storing in the multi-mode communication device a correspondence between a channel of a mode and frequency interference range generated by the channel;
    ab2) starting frequency hopping by the multi-mode communication device;
    ab3) deciding whether a mode starting frequency hopping is a highest priority mode currently used, and if so, performing frequency hopping, and otherwise, proceeding to a step ab4);
    ab4) setting each of currently-used modes with a priority higher than that of said mode starting frequency hopping as the higher priority mode, and said mode starting frequency hopping as a lower priority mode;
    b) determining a channel where a signal of the lower priority mode is interfered with by that of the higher priority mode;
    c) performing frequency hopping to outside said determined channel by the lower priority mode;
    d) deciding whether said mode starting frequency hopping is the lowest priority mode currently used, and if not so, executing step e); and
    e) deciding whether the signal after said mode starting frequency hopping performs frequency hopping is interfering with any of currently-used modes with a priority lower than said mode starting frequency hopping, and, if there is interference, causing those interfered modes to start frequency hopping in a descending order of priority.

2. The multi-mode coexistence method for the multi-mode communication device according to claim 1, wherein said step ab2) of starting frequency hopping includes starting a communication connection and starting a channel change.

3. The multi-mode coexistence method for the multi-mode communication device according to claim 1, wherein said step b) further comprises:
    b1) determining the channel used by the signal of the higher priority mode;
    b2) determining the frequency interference range of said signal of the higher priority mode based on the correspondence between the channel for said higher priority mode and the frequency interference range generated by the channel;
    b3) determining the channel for the lower priority mode which is located within the frequency interference range of said signal of the higher priority mode.

4. The multi-mode coexistence method for the multi-mode communication device according to claim 3, wherein said generated frequency interference range includes channel bandwidth of said channel.

5. The multi-mode coexistence method for the multi-mode communication device according to claim 4, wherein all modes supported by said multi-mode communication device comprise modes with different operating frequency domains.

6. The multi-mode coexistence method for the multi-mode communication device according to claim 5, wherein said generated frequency interference range further includes frequencies ranging beyond a predetermined threshold in the out-of-band spurs generated by said channel.

7. The multi-mode coexistence method for the multi-mode communication device according to claim 6, wherein, between said steps a) and ab 1), the method further comprises steps of:
   measuring a range of the frequencies beyond the predetermined threshold in the out-of-band spurs generated by said channel;
   determining the correspondence between said channel and said range of frequencies beyond the predetermined threshold based on the measurement result.

8. The multi-mode coexistence method of a multi-mode communication device according to claim 7, wherein, between said steps b) and c), the method further comprises a step of:
   determining a channel where the signal of the lower priority mode will interfere with that of the higher priority mode.

9. The multi-mode coexistence method for the multi-mode communication device according to claim 8, wherein said channel where the signal of the lower priority mode will interfere with that of the higher priority mode is a channel for the lower priority mode which includes the channel used by the higher priority mode and is located within the range of frequencies beyond the predetermined threshold in the generated out-of-band spurs.

10. The multi-mode coexistence method for the multi-mode communication device according to claim 4, wherein all modes supported by said multi-mode communication device have the same operating frequency domain.

11. The multi-mode coexistence method for the multi-mode communication device according to claim 10, wherein said multi-mode communication device supports WLAN (Wireless Local Area Network) and BlueTooth, and the mode priority of WLAN is set as higher than that of BlueTooth.

12. The multi-mode coexistence method for the multi-mode communication device according to claim 11, wherein, between said steps b3) and c), the method further comprises a step of:
   setting a channel quality level for adaptive frequency hopping in the BlueTooth mode.

* * * * *